US011803568B1

(12) United States Patent
Jain et al.

(10) Patent No.: US 11,803,568 B1
(45) Date of Patent: Oct. 31, 2023

(54) REPLICATING CHANGES FROM A DATABASE TO A DESTINATION AND MODIFYING REPLICATION CAPACITY

(71) Applicant: Amazon Technologies, Inc., Seattle, WA (US)

(72) Inventors: Vaibhav Jain, Seattle, WA (US); Rishabh Jain, Seattle, WA (US); Amit Gupta, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 16/829,311

(22) Filed: Mar. 25, 2020

(51) Int. Cl.
*G06F 16/27* (2019.01)
*G06F 16/22* (2019.01)
*G06F 16/182* (2019.01)
*G06F 16/21* (2019.01)
*G06F 11/34* (2006.01)
*G06F 11/30* (2006.01)

(52) U.S. Cl.
CPC ......... *G06F 16/27* (2019.01); *G06F 11/3034* (2013.01); *G06F 11/3409* (2013.01); *G06F 16/184* (2019.01); *G06F 16/214* (2019.01); *G06F 16/2282* (2019.01)

(58) Field of Classification Search
CPC .. G06F 16/2282; G06F 16/214; G06F 16/184; G06F 11/3034; G06F 11/3409
See application file for complete search history.

(56) References Cited

U.S. PATENT DOCUMENTS

| | | | |
|---|---|---|---|
| 6,889,333 B2 | 5/2005 | Lawrence et al. | |
| 6,976,093 B2 | 12/2005 | Lara et al. | |
| 10,073,856 B1 * | 9/2018 | Cooper | G06F 16/178 |
| 11,086,688 B2 * | 8/2021 | Bishop | G06F 9/5083 |
| 2014/0173035 A1 * | 6/2014 | Kan | G06F 3/0617 |
| | | | 709/217 |

FOREIGN PATENT DOCUMENTS

| | | | | |
|---|---|---|---|---|
| CN | 2533160 A1 * | 9/2010 | ............ | G06F 16/27 |
| JP | 2005-208950 A * | 8/2005 | ............ | G06F 12/00 |
| WO | WO-2020135551 A * | 7/2020 | ............ | G06F 16/27 |

* cited by examiner

*Primary Examiner* — Ken Hoang
(74) *Attorney, Agent, or Firm* — Robert C. Kowert; Kowert, Hood, Munyon, Rankin & Goetzel, P.C.

(57) ABSTRACT

A client of a distributed database service may conveniently enable replication of data from a source table to a destination (e.g., a different service/database table) by submitting a request enable replication for the source table. In response to the request to enable replication, the database service enables replication for the source table. To replicate a change, the database service may modify a format of the change based on a data storage format of the destination that is different than a data storage format of the database service. The database service monitors the performance of the replication and based on the performance, the database service may automatically modify the capacity to perform the replication of changes to the destination (e.g., by assigning additional resources to replication).

20 Claims, 9 Drawing Sheets

REPLICATING CHANGES FROM A DATABASE TO A DESTINATION AND MODIFYING REPLICATION CAPACITY

BACKGROUND

Database systems are used in a variety of scenarios to store data and to provide access to data. For example, a provider network may provide a database service that allows a client to store and retrieve data (e.g., by client applications). In some scenarios, a client may wish to store data into a particular database as well as one or more other locations. For example, a client may wish to have any updates to a particular database table to be made at another destination as well (e.g., another database or another service) in order to take advantage of different features offered by the other destination (e.g., different views of the data, different query capabilities, etc.). However, updating data at an additional destination introduces complexity and additional cost. For example, performing multiple writes to different database services for a transaction reduces database availability and increases latency. Moreover, a client may need to develop different customized functions which may be an expensive and cumbersome process that results in additional processing complexity and latency.

Figure 1:
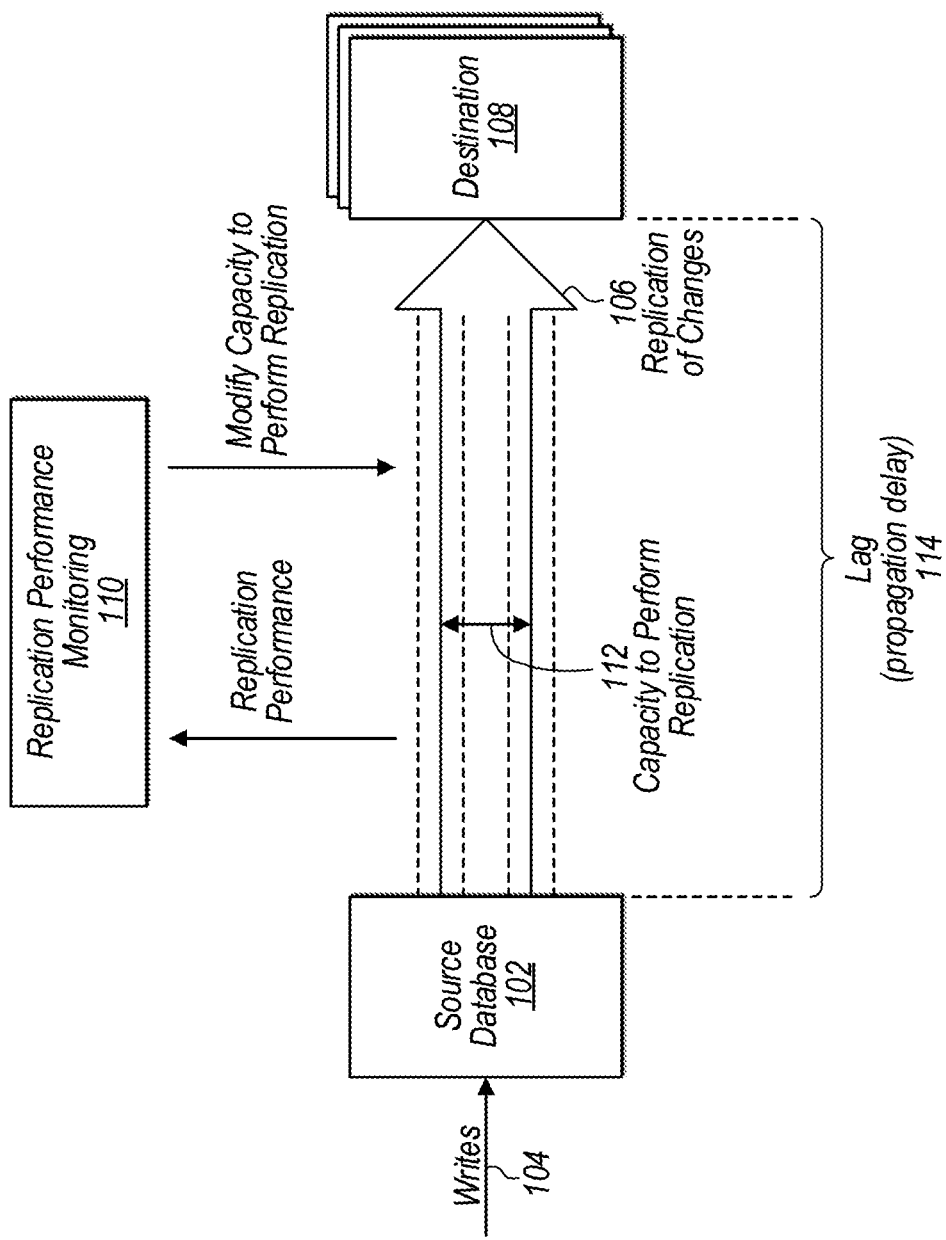
FIG. 1 is a logical block diagram illustrating replicating changes from a database to a destination and modifying replication capacity, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement replicating changes from a source database (e.g., changes for a table) to a destination and modifying the capacity to replicate the changes from the database to the destination, according to some embodiments. In some embodiments, the source database may be a distributed database that can offer performance advantages to users. By distributing the data and work to access data amongst multiple storage locations, a distributed database system can offer scalable, available, and highly performant storage. In embodiments, a user may easily enable replication for a source table to a destination by submitting a request (e.g., via "one-click" functionality or other convenient mechanism). Once replication for the table is enabled, any changes made to the table may be replicated to the destination(s). In embodiments, the performance of the replication is monitored and if necessary, the capacity to perform the replication is automatically modified. For example, if the replication lag from the source table to the destination becomes too long, then the database may use additional replication resources (e.g., replication nodes) to increase the capacity to perform replication from the source table to the destination.

Techniques for replicating changes from a database to a destination and modifying replication capacity, as discussed below, may reduce the complexity and associated costs to enable replication for source tables of a database, which may also lead to a reduction in replication errors. Furthermore, embodiments discussed herein may improve the performance of replication by continually monitoring the replication performance and automatically increasing/decreasing the capacity to perform replication when necessary (e.g., increasing capacity to keep replication lag within an acceptable range or decreasing capacity to free up some replication resources).

This specification begins with a general description of a database that may implement replicating changes from a source database to a destination and modifying the capacity to replicate the changes from the database to the destination. Then various examples of a databases are discussed, including different components/modules, or arrangements of components/module, that may be employed as part of implementing the database, in one embodiment. A number of different methods and techniques to implement replicating changes from a source database to a destination and modifying the capacity to replicate the changes from the database to the destination are discussed, some of which are illustrated in accompanying flowcharts. Finally, a description of an example computing system upon which the various components, modules, systems, devices, and/or nodes may be implemented is provided. Various examples are provided throughout the specification.

FIG. 1 is a logical block diagram illustrating replicating changes from a database to a destination and modifying replication capacity, according to some embodiments. Source database 102 may store data and update one or more tables in response to receiving writes 104 (e.g., from a client application). In embodiments, source database 102 is a distributed database and may store data (e.g., tables or partitions of database tables) across one or multiple locations, such as at different storage nodes. In some embodiments, the source database 102 may be any of various types of database systems, including relational and non-relational database systems that may allow transaction requests. In various embodiments, a "database" may refer to a database service (e.g., provided by a provider network) and vice-versa. Thus, in embodiments, a database may perform some or all of the functionality described herein for a database service. Although a source and destination table is described in example embodiments, any other type of source data object or destination data object may be used instead of a table, in embodiments.

In embodiments, the source database by receive, from a client (e.g., via a user management interface), a request to enable replication of changes 106 (e.g., updates or inserts) for a source table of the distributed database 102 to a destination 108. In embodiments, the request may specify the source table and/or the destination (e.g., a table of a different type of database). In some embodiments, one or more destinations have already been assigned as the destinations for the table during configuration by the client. Thus, the request to enable replication of changes may simply indicate that replication for the table is to be enabled (e.g., via "one-click" functionality or other convenient mechanism). For example, a user may select a radio button, checkbox, or other graphical element that is displayed next to the name of the source table in order to enable replication for the source table. In some embodiments, for any given source table, a list of available destinations may also be displayed. In such embodiments, the request to enable replication of changes may also indicate that replication for the table is to be enabled for one or more of the available destinations (e.g., via the "one-click" functionality described above).

In response to receiving a request to enable replication of changes 106 for a source table of the database 102 to a destination, the database 102 may enable the replication of changes 106 for the source table to the destination 108. Once replication is enabled, then any changes to the source table of the database 102 (e.g., updates and/or inserts) may be replicated to the destination(s) 108.

In embodiments, for a given change to be replicated, the database modifies a format of the change based on a data storage format of the destination that is different than a data storage format of the distributed database. For example, if a destination database uses different types of fields to store data into tables than the source database, then the source database may perform one or more different modifications to the change (e.g., the data to be inserted or updated at the destination table) to make the format of the change compatible with the destination database.

In various embodiments, once replication is enabled for a source table, the source database monitors the performance 110 of the replication of changes 106 for the source table to the destination (e.g., destination table) to determine whether to modify the capacity 112 to perform the replication of changes for the source table to the destination. Based on the monitored performance of the replication, the source database may or may not modify the capacity 112 to perform the replication of changes for the source table to the destination. For example, the source database may determine that the performance of the replication of changes has fallen below a threshold performance (e.g., lag/propagation delay 114 exceeds a threshold amount of time) and in response, the source database may increase the capacity 112 to perform the replication of changes for the source table to the destination (e.g., by assigning one or more new replication nodes to perform at least a portion of the replication of changes for the source table to the destination). In the depicted embodiment, the dashed lines along the arrow represent a potential increase or decrease of the capacity to perform replication for the source table/database to the destination.

In some embodiments, techniques may be implemented to preserve the order of updates at a destination(s). For example, implanting conditional writes and/or tombstones at a destination may preserve the correct order of updates that are applied. In embodiments, the source database receives feedback from a destination (e.g., using tombstones and/or conditional writes) indicating whether a replicated write/change is successful or not. Based on the feedback, the source database may make adjustments to the replication stream, such as re-sending one or more of updates (e.g., re-sending some or all updates that belong to a particular transaction).

Figure 3:
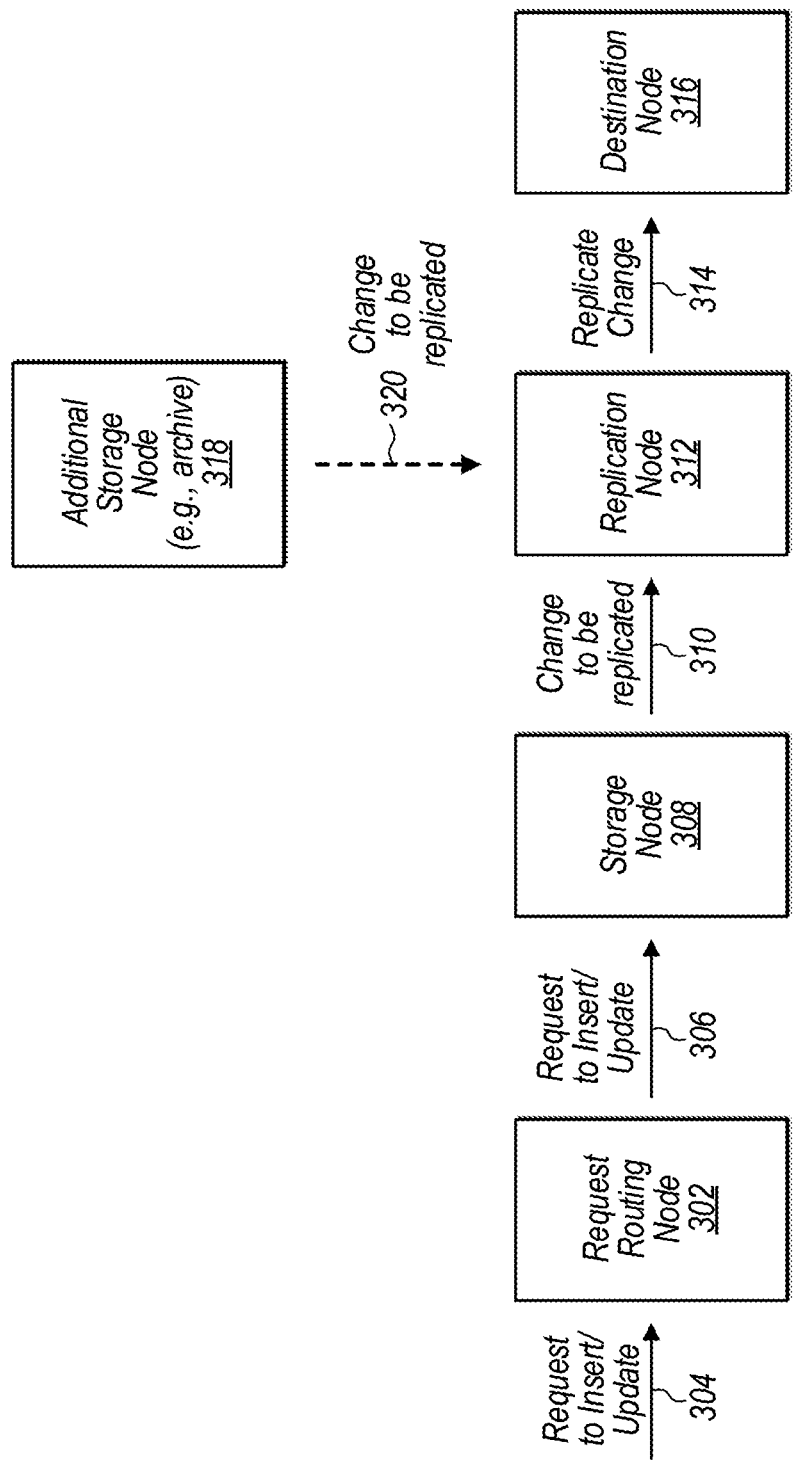
FIG. 3 is a logical block diagram illustrating a routing path for a request to update a table of a database, according to some embodiments.

In embodiments, another storage node (e.g., an archive storage node) may provide at least some of the changes to be replicated to the replication node, which are then replicated to a destination (as shown in FIG. 3). For example, if the replication pipe to process new inserts/updates to a table of the source database is relatively slow, then the source database may use an archive storage node to retrieve inserts/updates that were made to the table further back in time and to send them to the replication node. The replication node may then replicate them to the destination.

Figure 2:
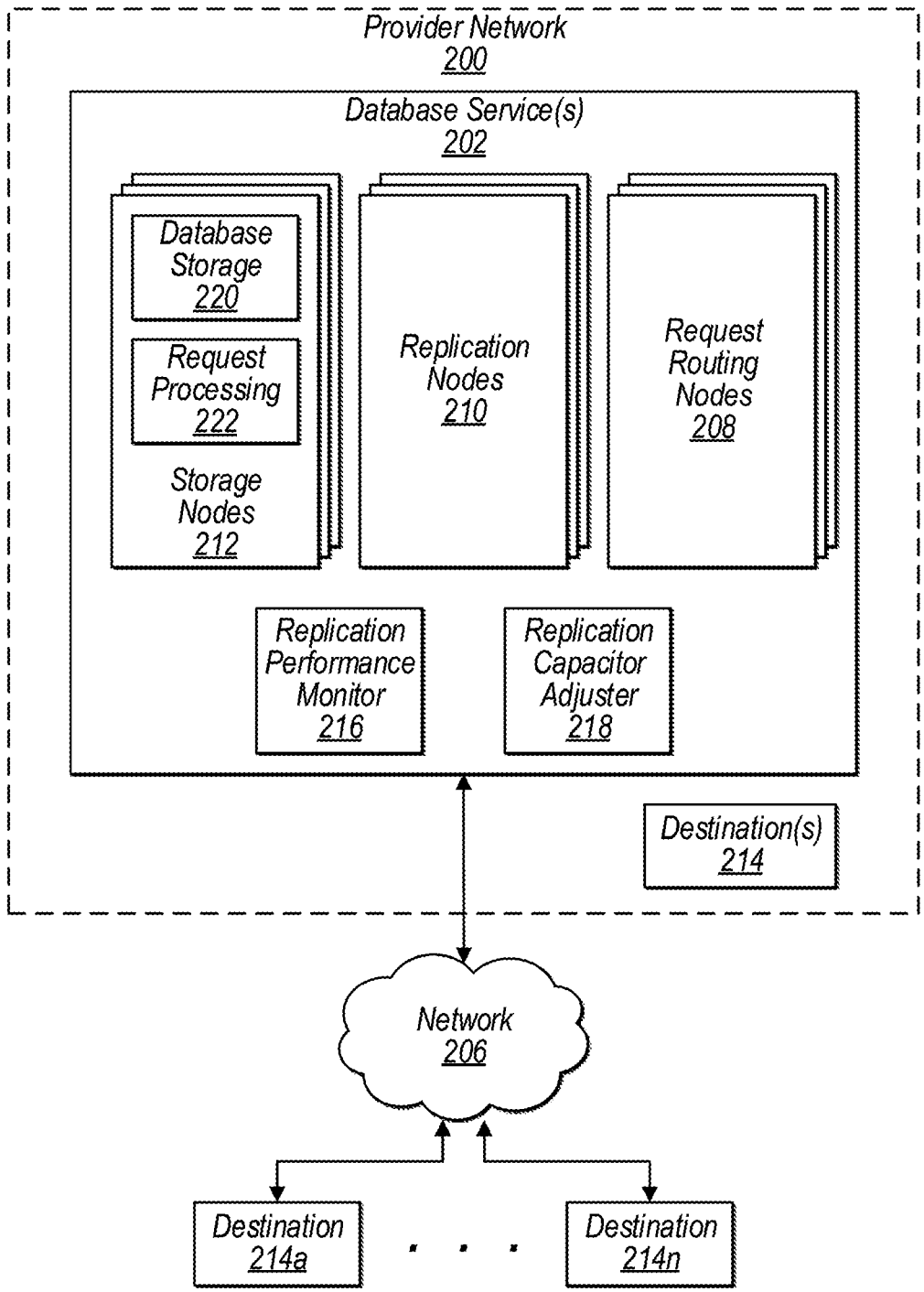
FIG. 2 is a logical block diagram illustrating a provider network that implements a database service that may implement replicating changes from a database to a destination and modifying replication capacity, according to some embodiments.

FIG. 2 is a logical block diagram illustrating a provider network that implements a database service that may implement replicating changes from a database to a destination and modifying replication capacity, according to some embodiments. Provider network 200 may be a private or closed system, in one embodiment, or may be set up by an entity such as a company or a public sector organization to provide one or more services (such as various types of cloud-based storage) accessible via the Internet and/or other networks to one or more clients, in another embodiment. In one embodiment, provider network 200 may be implemented in a single location or may include numerous data centers hosting various resource pools, such as collections of physical and/or virtualized computer servers, storage devices, networking equipment and the like (e.g., computing system 900 described below with regard to FIG. 9), needed to implement and distribute the infrastructure and storage services offered by the provider network 200. In one embodiment, provider network 200 may implement various computing resources or services, such as database service(s) 202 (e.g., relational or non-relational (NoSQL) database query engines), and other services (not illustrated), such as a map reduce service, data warehouse service, data flow processing service, and/or other large scale data processing techniques, data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of database service(s) 202) may be implemented by a particular node or may be distributed across several nodes. In some embodiments, a given node may implement the functionality of more than one service system component (e.g., more than one data store component).

Database service(s) 202 may include various types of database services, in one embodiment, (both relational and/or non-relational) for storing, querying, and updating data. Such services may be enterprise-class database systems that are highly scalable and extensible. In one embodiment, queries may be directed to a database in database service(s) 202 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 202 may provide a RESTful programmatic interface in order to submit access requests (e.g., to get, insert, delete, or query data). In one embodiment, database service(s) 202 may also be any of various types of data processing services that implement or allow transactions.

In embodiments, clients of the provider network 200 may encompass any type of client configurable to submit network-based requests to provider network 200 via network 206, including requests for database service(s) 202 (e.g., to perform an insert/update to a table of a database hosted in database service 202, to submit a request to enable replication of changes for a source table to a destination, etc.). For example, in one embodiment a given client may include a suitable version of a web browser, or may include a plug-in module or other type of code module that executes as an extension to or within an execution environment provided by a web browser. Alternatively in a different embodiment, a client may encompass an application such as a database client/application (or user interface thereof), a media application, an office application or any other application that may make use of a database in database service(s) 202 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client may be an application that interacts directly with provider network 200, in one embodiment. In one embodiment, client 250 may generate network-based services requests according to a Representational State Transfer (REST)-style network-based services architecture, a document- or message-based network-based services architecture, or another suitable network-based services architecture. Note that in some embodiments, any number of the clients of database service(s) 202 may be implemented within provider network 200 instead of or in addition to external clients (e.g., applications hosted within the provider network on a virtual compute service).

In an embodiment, a client may provide access to provider network 200 to other applications in a manner that is transparent to those applications. For example, a client may integrate with a database on database service(s) 202. In such an embodiment, applications may not need to be modified to make use of the storage system service model. Instead, the details of interfacing to the database service(s) 202 may be coordinated by the client.

Client(s) may convey network-based services requests to and receive responses from provider network 200 via network 206, in one embodiment. In one embodiment, network 206 may encompass any suitable combination of networking hardware and protocols necessary to establish network-based-based communications between clients and provider network 200. For example, network 206 may encompass the various telecommunications networks and service providers that collectively implement the Internet. In one embodiment, network 206 may also include private networks such as local area networks (LANs) or wide area networks (WANs) as well as public or private wireless networks. For example, both a given client and provider network 200 may be respectively provisioned within enterprises having their own internal networks. In such an embodiment, network 206 may include the hardware (e.g., modems, routers, switches, load balancers, proxy servers, etc.) and software (e.g., protocol stacks, accounting software, firewall/security software, etc.) necessary to establish a networking link between given client(s) and the Internet as well as between the Internet and provider network 200. It is noted that in one embodiment, client(s) may communicate with provider network 200 using a private network rather than the public Internet.

Database service 202 may implement request routing nodes 208, in one embodiment. Request routing nodes 208 may receive, authenticate, parse, throttle and/or dispatch service or other access requests, among other things, in one embodiment. As discussed below with regard to FIGS. 3 and 4, a replication node, such as one of replication nodes 210, may be implemented to perform replication of changes (e.g., updates/inserts) for a source table of the database service 202 (e.g., a table stored at one or more storage nodes 212) to a destination 214, in some embodiments. As shown, replication may be performed from the database service 202 to any number of external destinations 214a-214n and/or to any number of internal destinations 214 within the provider network 200.

In the depicted embodiment, the replication performance monitor 216 of the database service 202 performs functionality described for replication performance monitoring 110 of FIG. 1. Therefore, the replication performance monitor 216 may monitor the performance of the replication of changes for a given source table of the database service 202 to a given destination 214 to determine whether to modify the capacity to perform the replication of changes for the given source table to the given destination. Based on the monitored performance of the replication, the replication capacity adjuster 218 may or may not modify the capacity to perform the replication of changes for the given source table to the given destination 214. For example, the performance monitor 216 may determine that the performance of the replication of changes for a particular source table to the destination 214a (e.g., a table at a database of a remote client network) has fallen below a threshold performance (e.g., propagation delay 114 exceeds a threshold amount of time) and in response, the replication capacity adjuster 218 may increase the capacity to perform the replication of changes for the particular source table to the destination 214a (e.g., by assigning one or more new replication nodes 210 to perform at least a portion of the replication of changes for the particular source table to the destination 214a). In an embodiment, in order to increase the capacity to perform the replication of changes, the replication capacity adjuster 218 may send an instruction to the destination to assign one or more new destination resources (replication/ingestion nodes) for the replication (instead of or in addition to the assigning of new replication nodes at the database service 202).

In some embodiments, the database service 202 may send replication performance data to the destination to cause the destination to scale resources up or down based on the replication performance data (causing the capacity to perform the replication of changes for the particular source table to the given destination to be increased or decreased). For example, the destination may assign new replication nodes/resources if the propagation delay is above the threshold amount of time (or free up replication nodes/resources if the propagation delay is below the threshold amount of time by a certain amount).

In embodiments, a destination 214 within the provider network 200 may be another service that offers clients different functionality than that offered by the database service 202. For example, the destination 214 may be another database service that includes a different type of database or may be an object storage service that stores objects to an object-based data store. In embodiments, the destination may be an analytics service that provides search and/or analytics capability for data that is stored/loaded into a database (e.g., including the creation of new index tables to be used for search queries). For example, the analytics service may include a RESTful search and analytics engine built on top of the database system. To replicate changes from the source table to the destinations (e.g., the analytics service), the database service 202 may perform various modifications to the changes/updates to be replicated (e.g., converting data format to different formats for different database types, converting data/data format into files/file formats such as JSON, etc.) before transmitting the changes/updates to the destination.

In various embodiments, the destination may be a type of service (e.g., data streaming service) that ingests the changes from the source table/database in one or more partitions of a stream. Thus, changes for a source table may be sent to different partitions (or different "shards") of a replication stream of the data streaming service. In embodiments, a given change/update includes a version or transaction identifier for the source table write and different updates for a transaction may be load-balanced across multiple partitions of the replication stream to more evenly distribute the workload across the partitions. A consumer application or service that consumes the different partitions of the update stream may then use the version/transaction identifier to identify the transaction that each update belongs to. In some embodiments, the database service itself will generate the different stream partitions (e.g., using one or more replication nodes) before sending them to a destination(s).

In embodiments, there may not necessarily be a 1:1 mapping of source partitions (e.g., source shards) to destination partitions (e.g., destination shards). For example, 10 stream partitions for the source table may provide data across 5 stream partitions for a destination table. Thus, any particular write to a given source partition may be replicated to any of the destination partitions. In embodiments, the destination database may arrange the writes in the proper order based on a unique sequence number associated with each write (e.g., accompanying each write made to the source/destination partitions). For example, a write associated with sequence number "7" will be written to the destination before another write associated with sequence number "8."

In one embodiment, request routing nodes 208 may support handling requests formatted according to an interface to support different types of web services requests. For example, in one embodiments, database service 202 may implement a particular web services application programming interface (API) that supports a variety of operations on tables (or other data objects) that are maintained and managed on behalf of clients/users by the data storage service system (and/or data stored in those tables). In one embodiment, database service 202 may support different types of services requests. For example, in one embodiments, database service 202 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 208 may perform parsing and/or throttling of service requests, authentication and/or metering of service requests, dispatching service requests, and/or maintaining partition assignments that map storage nodes to partitions of tables hosted in database service(s) 202.

In an embodiment, database service 202 may implement a control plane to implement one or more administrative components. The control plane may provide visibility and control to system administrators, detect split events for partitions of tables at storage nodes, and/or anomaly control, resource allocation, in one embodiment. In one embodiment, the control plane may also include an admin console, through which system administrators may interact with database service 202 (and/or the underlying system). In one embodiment, the admin console may be the primary point of visibility and control for database service 202 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated.

In embodiments, the control plane may direct the performance of different types of control plane operations among the nodes, systems, or devices implementing database service 202. For instance, the control plane may communicate with processing nodes to initiate the performance of various control plane operations, such as moves, splits, update tables, delete tables, create indexes, etc. In one embodiment, the control plane may include a node recovery feature or component that handles failure events for storage nodes 212, replication nodes 210, and request routing nodes 208 (e.g., adding new nodes, removing failing or underperforming nodes, deactivating or decommissioning underutilized nodes, etc.).

In one embodiment, database service 202 may implement a plurality of storage nodes 212, each of which may manage one or more partitions of a database table on behalf of clients/users or on behalf of database service 202 which may be stored in database storage 220 (on storage devices attached to storage nodes 212 or in network storage accessible to storage nodes 212).

Storage nodes 212 may implement request processing 222, in one embodiment. Request processing 222 may create, update, define, query, and/or otherwise administer databases, in one embodiment. For instance, request processing 222 may maintain a database according to a database model (e.g., a relational or non-relational database model). In one embodiment, request processing 222 may allow a client to manage data definitions (e.g., Data Definition Language (DDL) requests to describe column definitions, requests to add item attributes, etc.). In one embodiment, request processing 222 may handle requests to access the data (e.g., to perform transactions, to insert, modify, add, or delete data, and requests to query for data by generating query execution plans to determine which partitions of a database may need to be evaluated or searched in order to service the query). In one embodiment, request processing 222 may also perform other management functions, such as enforcing access controls or permissions, concurrency control, or recovery operations.

In an embodiment, database service 202 may provide functionality for creating, accessing, and/or managing tables at nodes within a single-tenant environment that are different than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 212 process access requests on behalf of clients directed to tables. Some of these processing nodes may operate as if they were in a multi-tenant environment, and others may operate as if they were in a single-tenant environment. In some embodiments, storage nodes 212 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 212 in separate partitions, storage nodes 212 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the database service 202. Moreover, different replica groups may utilize overlapping nodes, where a storage node 212 may be a member of multiple replica groups, maintaining replicas for each of those groups whose other storage node 212 members differ from the other replica groups.

Different models, schemas or formats for storing data for database tables in database service 202 may be implemented, in some embodiments. For example, in some embodiments, a relational data model that stores database tables structured as rows with fields for a defined number of columns may be implemented. In some embodiments, non-relational (e.g., NoSQL), key-value, or semi structured data may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 202 (and the underlying storage system) may have no pre-defined schema other than their reliance on the primary key, in some embodiments.

In embodiments, the models, schemas and/or formats for storing data for database tables in the database service 202 are different than those for storing data for database tables in a destination 214 (e.g., a destination database, table, or other data storage object). Therefore, for a given change to be replicated, the database service 202 may modify a format of the change based on a model, schema, and/or data storage format of the destination 214 that is different than a model, schema, and/or data storage format of the database service 202.

Database service 202 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 202 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 202 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 202 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 202 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

FIG. 3 is a logical block diagram illustrating a routing path for a request to update a table of a database, according to some embodiments. A request routing node 302 may receive a request 304 to insert, update, or delete one or more items (e.g., fields, records, etc.) in a database table, in some embodiments. The request routing node 302 may direct the request 306 to a storage node 308 that stores the item (e.g., in the appropriate partition of a database table), in some embodiments. For example, request routing node 302 may maintain a listing or other information describing a partitioning scheme for a table (e.g., a primary key value and hash function to determine a hash value that may be mapped to one partition of the table). Storage node 308 may determine whether to complete or fail the request to insert, update, or delete the individual item. In some embodiments, an indication that the request completed or failed may be provided by the storage node 308 back to the request routing node 302, which may in turn provide the request completion/failure notification to a client.

As shown, the storage node 308 may send the change (e.g., update) 310 to be replicated to a replication node 312. The replication node may then replicate 314 the change to the destination 316. In embodiments, the replication node may modify a format of the change based on a data storage format of the destination (e.g., the data storage format of the destination may be different than the data storage format of the source table at the storage node).

In embodiments, an additional storage node 318 (e.g., an archive storage node from the database service or from a different storage service/database) may provide at least some of the changes 320 to be replicated to the replication node, which are then replicated to a destination (as shown in FIG. 3). For example, if the replication pipe to process new inserts/updates to a table of the source database is relatively slow, then the source database may use an archive storage node to retrieve inserts/updates further back in time and to send them to the replication node. At any given time or time period, the replication node may obtain changes to be replicated 310 from the storage node 308 and/or changes to be replicated 320 from the additional storage node 318. Thus, in embodiments, the replication node 312 may receive at least some of the changes 310 concurrently with or at approximately the same time as receiving at least some of the changes 320.

Figure 4:
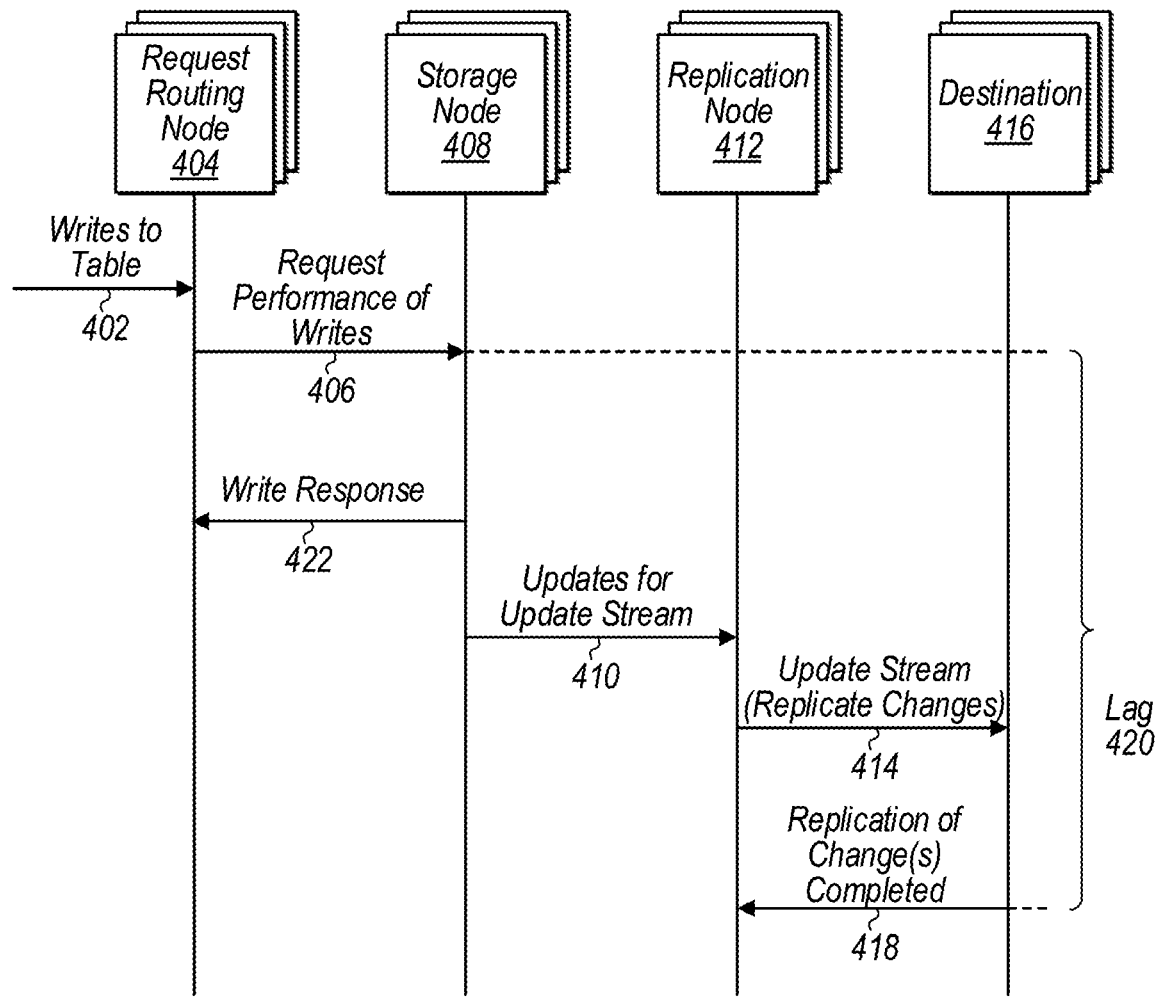
FIG. 4 is a sequence diagram illustrating replication of writes to a destination and determining replication lag, according to some embodiments.

FIG. 4 is a sequence diagram illustrating replication of writes to a destination and determining a replication lag, according to some embodiments. In at least some embodiments, a request 402 to perform a write to a table may be received at a request routing node 410. The request routing node 410 may send a request to perform the write 406 to a storage node 408. The write is then performed at the storage node 408 (e.g., update or insert at a table and/or table partition stored at the storage node). In embodiments, the time that the write was performed at the storage ("write time") may be stored by the storage node 408, the replication node 412, and/or the database that includes the storage node. The storage node also sends an update (e.g., indicating the write) for an update stream 410 to a replication node 412. In some embodiments, the storage node sends the update to the replication node 412 in response to determining that the write to the table/storage node was completed and/or committed.

As shown, the replication node 412 sends an update stream 414 of updates to the destination 416. Therefore, the replication node may send a stream of multiple updates (e.g., a sequence of updates over time) to a destination, where each update indicates and/or includes the change to be replicated to the destination. As depicted, the replication node 412 also receives an acknowledgement from the destination that replication of the change(s) were completed (e.g., accepted at the destination for storage and/or processing). In embodiments, an acknowledgement may be received for each (or at least some) update that was sent to the destination and that was completed at the destination. In embodiments, the acknowledgement may also indicate a time that the update was accepted at the destination or include time information that can be used by the database and/or replication node to determine/calculate the time that the update was accepted at the destination ("accepted time").

In some embodiments, the database and/or replication node may determine the replication lag 420 (e.g., the performance of the replication of changes) by determining the difference between the write time (the time that the write was performed at the storage node 408) and the accepted time (the time that the destination accepted the update). As discussed herein, based on the monitored performance (e.g., the replication lag 420), the database may modify the capacity to perform the replication of changes for the source table (at the storage node 408) to the destination 416 (e.g., by assigning one or more new replication nodes for performing the replication of changes for the source table to the destination 416).

In the depicted embodiment, the storage node 408 returns a write response 422 to the write request before the write is replicated to the replication node and/or to the destination. Therefore, the client does not have to wait until replication is complete in order to receive a response message indicating that the write was successful. In some embodiments, the request routing node 404 itself may return to the client a write response (e.g., write success or failure) to the write request before the write is stored at the storage node and/or replicated.

Figure 5B:
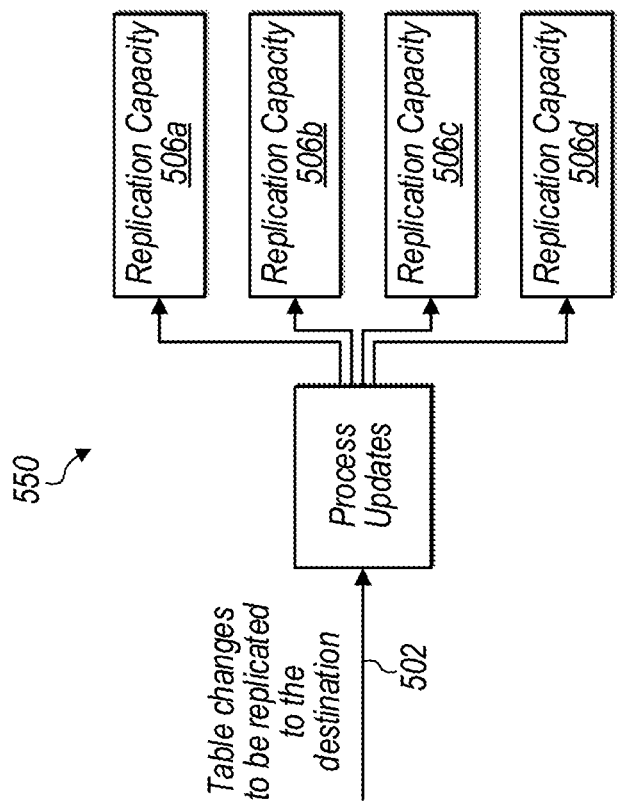
FIGS. 5A and 5B are logical block diagrams illustrating modifying the capacity to perform replication of changes for a source table to a destination, according to some embodiments.
Figure 5A:
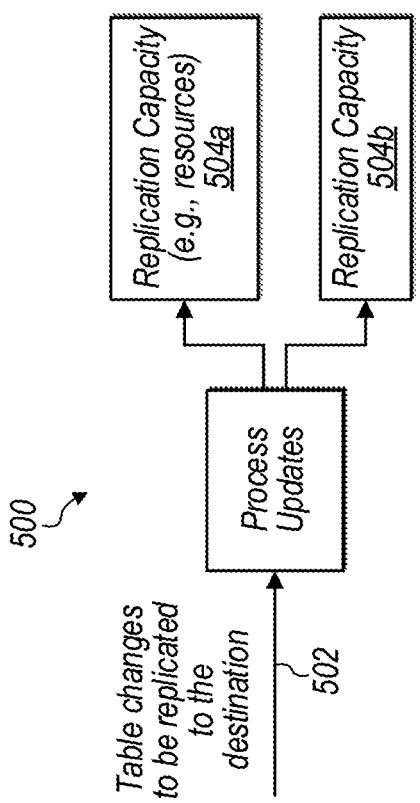

FIGS. 5A and 5B are logical block diagrams illustrating modifying the capacity to perform replication of changes for a source table to a destination, according to some embodiments. As shown in FIG. 5A, updates (e.g., changes to be replicated) for a particular source table are processed by a set of one or more resources (e.g., replication nodes) that have a particular replication capacity 504a or another set of one or more resources (e.g., replication nodes) that have another replication capacity 504b. As depicted, the updates are distributed two different stream partitions for processing according to the replication capacity 504a and the replication capacity 504b. In embodiments, each update may include an identifier (e.g., transaction identifier) that the update belongs to. Therefore, updates for a transaction can be distributed across multiple partitions yet still be identified at a destination as part of the same transaction. In some embodiments, the updates for a source table and/or a transaction may each be sent to the destination in the order that the changes were made to the source table and/or with a sequence number that identifies the order that the change was made to the source table relative to the other changes to the source table.

As shown in FIG. 5B, the capacity to perform replication of changes for the source table to the destination has been increased by assigning additional replication resources (e.g., replication nodes) to concurrently process the updates for the particular source table. As depicted, the updates are processed by four different sets of one or more resources (e.g., replication nodes) that each have a particular replication capacity 504a. The updates are now distributed across four different stream partitions for processing according to the replication capacity 504a and the replication capacity 506a, 506b, 506c, or 506d. Therefore, the capacity to perform replication may be approximately twice the capacity represented in FIG. A. As in FIG. 5A, in some embodiments the updates for the streams may include identifiers so that they can be identified at a destination as part of the same transaction. In some embodiments, the updates for a source table and/or a transaction may each be sent to the destination in the order that the changes were made to the source table and/or with a sequence number that identifies the order that the change was made to the source table relative to the other changes to the source table.

Figure 6:
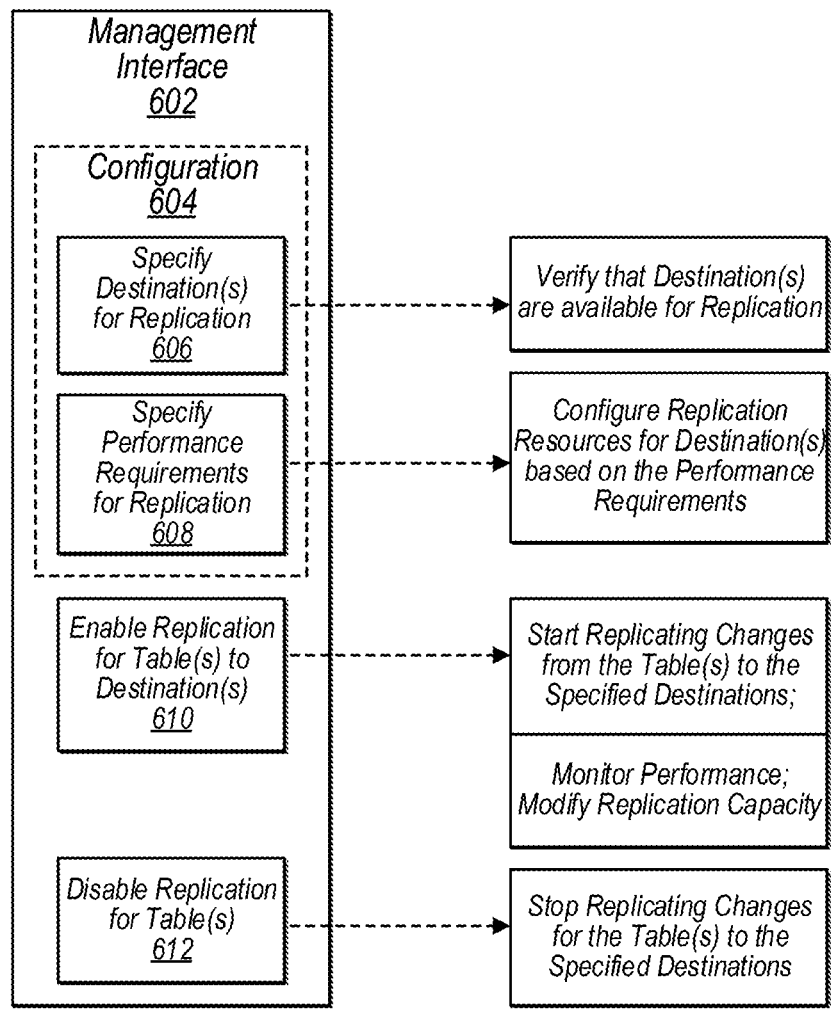
FIG. 6 is a logical block diagram illustrating various functions for replicating changes from a database to a destination that are accessible via a user interface, according to some embodiments.

FIG. 6 is a logical block diagram illustrating various functions for replicating changes from a database to a destination that are accessible via a user interface, according to some embodiments. In embodiments, the management interface 602 may be an interface provided by a database service (e.g., an API provided by database service 202). Therefore, a user/client at a remote client network or within the provider network 200 may access the functionality of the management interface via a graphical user interface, command line interface, and/or using any other suitable technique.

As shown, the management interface 602 provides various functions for configuration 604 of the database for replicating changes from a database (e.g., from tables or other objects) to a destination. For example, a client may specify one or more destinations for replication 606 from a database and/or source table/object provided by database service 202. In response to specifying a particular destination (e.g., another table or other object of another service/DB), the database service 202 may verify whether the destination is available for replication to. For example, the database service may determine whether the client and/or a particular user associated with the client has authorization to access/use the particular destination to replicate data to. If the client/user has permission to access a destination table/DB, then the database service 202 will allow the user to enable replication for the destination. If not, then the database service may not allow the user to enable replication for the destination and provide a message (e.g., via an API) indicating access was denied.

In embodiments, the management interface 602 may also allow a client administrator to add or remove permission to replicate to a given destination (e.g., another service, destination, etc.) to individual users. In some embodiments, to specify the destination, the client may provide a network address and/or another identifier that uniquely identifies the destination on the provider network with respect to other available destinations.

In some embodiments, the management interface 602 may also allow a client administrator to add or remove permission to create or remove a given destination (e.g., a table at another database service, an object at an object storage service, an instance of a scalable data storage and search service, etc.) to individual users. In embodiments, the database service may access an identity/authorization management system or service of the provider network in order to obtain the permissions for clients/users to create or remove a destination.

In various embodiments, the database service may receive, from a client (e.g., a user), a request to create a replication destination (e.g., a destination table or an instance). In response to receiving the request to create the destination, the database service may determine whether the client is authorized to create the destination. If not, the database service may deny the request and return to the client a message indicating permission was denied. If the database service determines that the client is authorized, then the database service creates the replication destination. For example, the database service may cause a destination table to be created by sending a message or command to the destination database service to create the destination table for the use as a replication destination.

In embodiments, the database service may cause a destination instance to be created by sending a message or command to the destination scalable data storage and search service to create the instance for the use as a replication destination. In embodiments, the scalable data storage and search service may provide a convenient way for the client to search through large volumes of data. The querying capabilities of the scalable data storage and search service may not be available to the database service. Therefore, the client may take advantage of the other service's search capability in a convenient manner (e.g., via one-click replication), without having to manage various aspects of the replication process.

As part of configuration, the client/user may also specify one or more performance requirements for replication 608 to a particular destination. For example, the client/user may provide a threshold performance parameter such as maximum acceptable lag/delay (e.g., propagation delay 420 of FIG. 4) for replication from a particular source table (e.g., from a table of the database service 202) to the particular destination. In response, the database service 202 may configure a sufficient amount of replication resources (e.g., a sufficient number of one or more replication nodes, etc.) for replication such that the propagation delay/lag will remain at or below the user-provided maximum (e.g., given a particular expected amount of table usage/throughput for changes at the source table that may be provided by the client or set as a default value). In some embodiments, the database service 202 assigns a default value to any number of threshold performance parameters (e.g., propagation delay 420) if the client does not configure it. In embodiments, the maximum acceptable lag/delay and/or any other number of performance parameters/specifications may be assigned by the provider network (e.g., as pre-defined values). In some embodiments, the database service scales resources as necessary (e.g., up to a maximum number of resources/replication nodes available to the client) in order to achieve the best possible replication performance.

The management interface 602 may also allow a client/user to enable replication 610 (e.g., via "one-click" functionality or other convenient mechanism) for a source table. In response, the database service 202 may start replicating any changes from the source table to the specified destination(s) assigned for the source table. In embodiments, the database service 202 may also monitor the performance of the replication and if necessary, modify the capacity to perform the replication of changes (e.g., in response to determining that the replication performance has fallen below a threshold performance specified by a threshold performance parameter. In embodiments, the management interface 602 may also allow a client/user to disable replication 612 (e.g., via "one-click" functionality or other convenient mechanism) for a source table. In response, the database service 202 may stop replicating changes from the source table to the destination(s) that were assigned to the source table.

Figure 7:
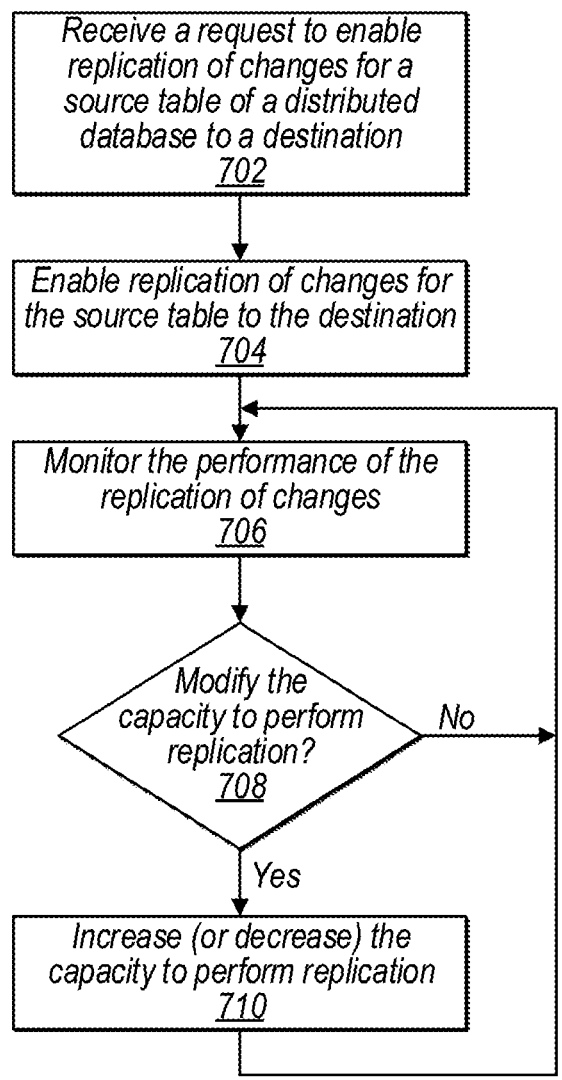
FIG. 7 is a high-level flowchart illustrating various methods and techniques to implement replicating changes from a database to a destination and modifying replication capacity, according to some embodiments.

The examples of a database service that implements as discussed in FIGS. 1-6 above have been given in regard to a database service (e.g., a non-relational or NoSQL database service or a relational database service). However, various other types of data access, management, or control systems or data processing systems may implement transactions across a distributed database and thus may implement replicating changes from a source database to a destination and modifying the capacity to replicate the changes from the database to the destination, in other embodiments. FIG. 7 is a high-level flowchart illustrating various methods and techniques to implement replicating changes from a source database (e.g., changes for a table) to a destination and modifying the capacity to replicate the changes from the database to the destination, according to some embodiments. These techniques, as well as the techniques discussed with regard to FIG. 8, may be implemented using components or systems as described above with regard to FIGS. 1-6, as well as other types of databases, storage engines, or systems, and thus the following discussion is not intended to be limiting as to the other types of systems that may implement the described techniques.

As indicated at 702, a request may be received to enable replication of changes for a source table of a distributed database to a destination, in various embodiments. For example, a request to enable replication for a source table to a destination table/DB may be received by a database service 202 of a provider network. In response, the database service 202 may enable replication of changes for the source table to a destination.

At block 706, the database service 202 monitors the performance of the replication of changes. For example, the database service 202 may collect data/metrics that indicate the propagation delay/lag between from source table writes to the destination table/DB. At block 708, the database service 202 determines whether to modify the capacity to perform the replication based on the monitored performance (e.g., collected data/metrics). For example, the database service 202 may perform the above determination/check on a periodic basis (e.g., once a minute), randomly, or based on another user-specified schedule.

Based on the data/metrics collected since the previous check, the database service 202 may determine whether to modify the replication capacity. For example, if the database service 202 determines that the performance (e.g., due to lag) has not fallen below a threshold, then the process may return to block 706. If the database service 202 determines that the performance has fallen below the threshold, then the database service 202 may increase the capacity to perform replication at block 710. In some embodiments, if the database service 202 determines that the performance has not fallen below a threshold for at least a threshold period of time (e.g., propagation delay/lag has not gone above the threshold propagation delay for a period of time) or that the performance is well above the minimum acceptable level (e.g., the propagation delay/lag is a certain amount below the threshold propagation delay), then the service may decrease the capacity to perform replication (e.g., free up one or more replication nodes for use by other source tables for replication to the same and/or other destinations).

Figure 8:
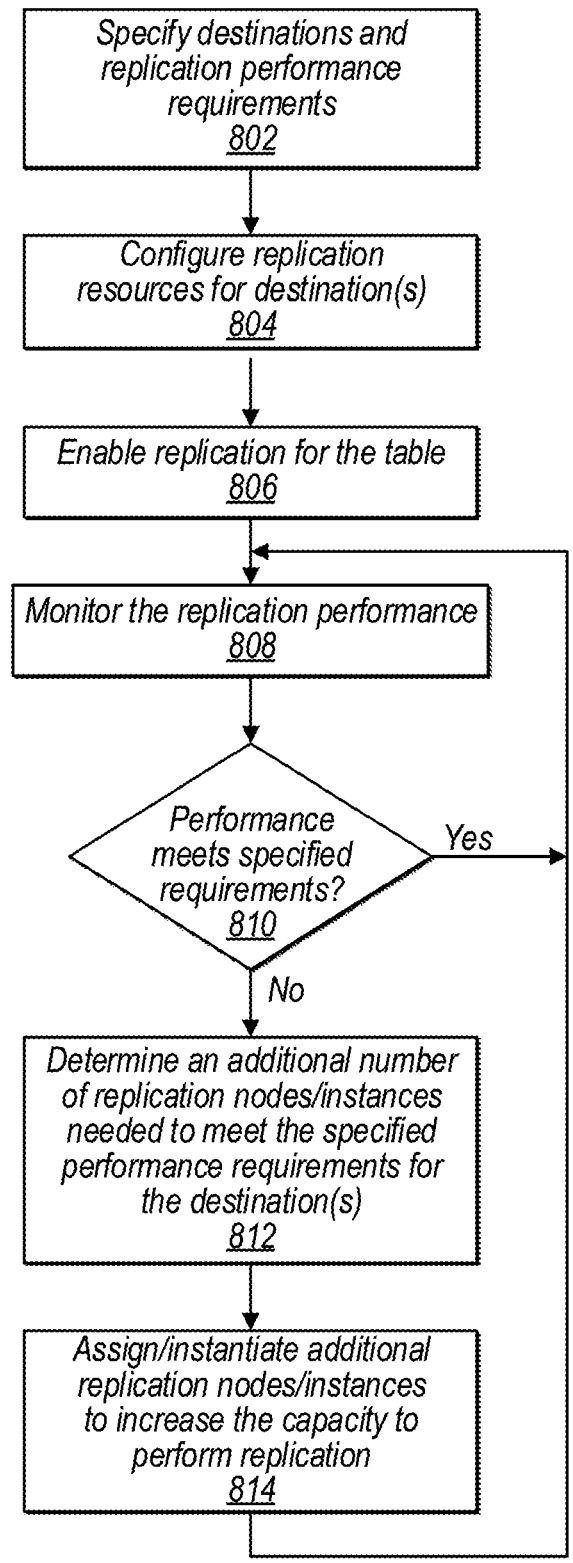
FIG. 8 is a high-level flowchart illustrating various methods and techniques to implement replicating changes from a database to a destination and modifying replication capacity, according to some embodiments.

FIG. 8 is a high-level flowchart illustrating various methods and techniques to implement replicating changes from a database to a destination and modifying replication capacity, according to some embodiments. As indicated at 802, as part of initial configuration, a user/client may specify destinations and/or performance requirements for replication from a table of database service (e.g., as described for FIG. 6). At block 804, the database service may then configure replication resources for the destinations specified by the user/client.

At block 806, the database service enables replication for the source table(s). For example, a request to enable replication for a source table to a destination table/DB may be received by a database service 202 of a provider network and in response, the database service 202 may enable replication of changes for the source table to a destination. In embodiments, the database service may perform at least some of the above configuration steps and/or additional configuration steps for the source table before replication begins. In some embodiments, after the replication for the table is configured and/or enabled, the database service provides a response to the client to indicate that the replication for the table has been enabled. The database service 202 then begins monitoring performance of the replication of changes at block 808.

At block 810, the database service 202 determines whether monitored performance meets specified requirements (and/or default requirements) for performance of replication (e.g., based on collected data/metrics). For example, the database service 202 may determine whether the performance (e.g., due to lag) has fallen below a threshold. If performance requirements are met, then the process returns to block 808 to continue monitoring.

If the database service 202 determines that performance does not meet the performance requirements, then at block 812 the database service 202 may determine an additional number of replication nodes/instances needed (e.g., based on the data/metrics such as the amount of propagation delay) in order to meet/satisfy the performance requirements for the destination(s). For example, the number of additional replication nodes/instances needed may be proportional to the amount of propagation delay/lag. At block 814, the database service 202 assigns and/or instantiates the additional number of replication nodes/instances for replication form the source table to the destination(s) in order to increase the capacity to perform replication. The process then returns to block 808 for continued monitoring.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
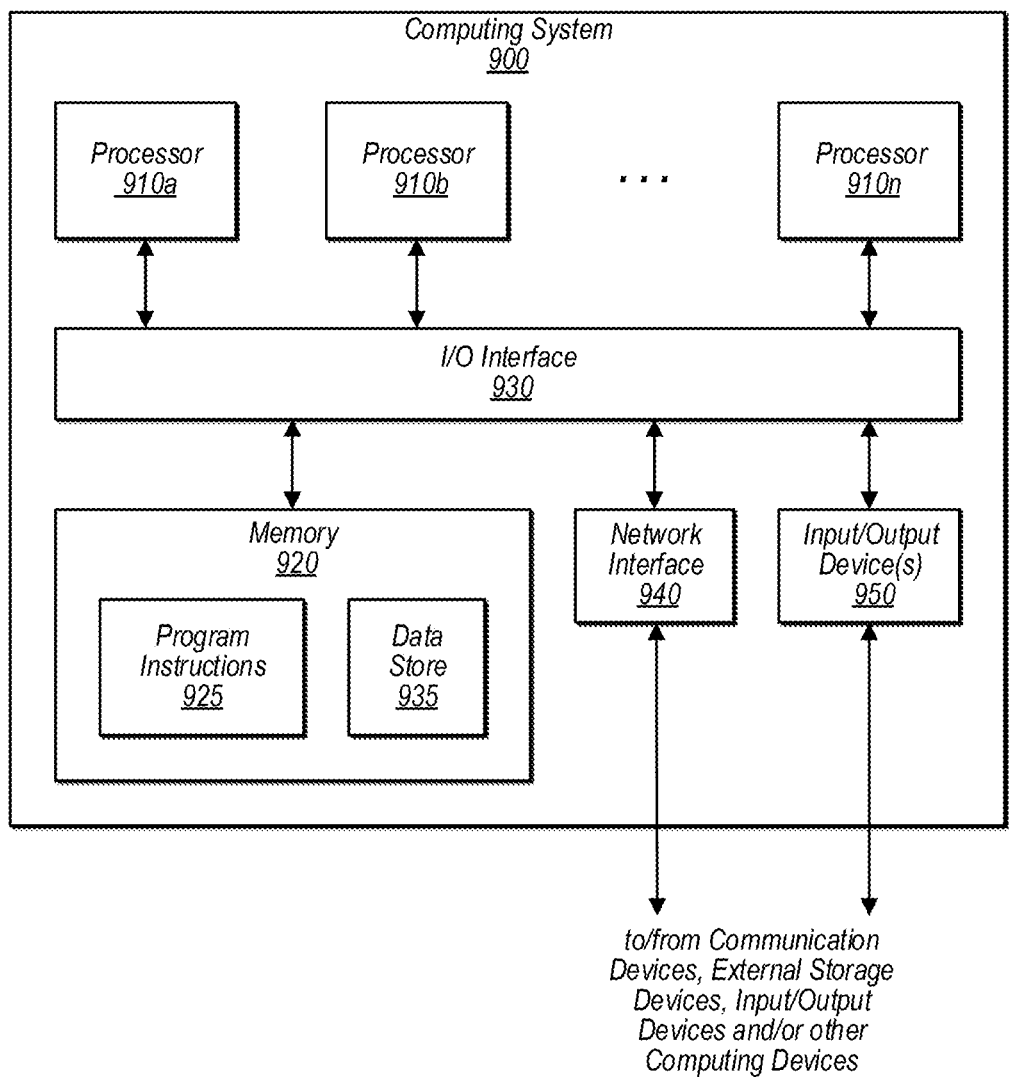
FIG. 9 is a block diagram illustrating an example computing system, according to some embodiments.

Embodiments to implement replicating changes from a source database (e.g., changes for a table) to a destination and modifying the capacity to replicate the changes from the database to the destination as described herein may be executed on one or more computer systems, which may interact with various other devices. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions, in one embodiment. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 920 may store program instructions 925 and/or data accessible by processor 910, in one embodiment. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 920 as program instructions 925 and data storage 935, respectively. In other embodiments, program instructions and/or data may be received, sent or stored upon different types of computer-accessible media or on similar media separate from system memory 920 or computer system 900. A computer-accessible medium may include non-transitory storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940, in one embodiment.

In one embodiment, I/O interface 930 may be coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900, in one embodiment. In various embodiments, network interface 940 may support communication via wired or wireless general data networks, such as any suitable type of Ethernet network, for example;

via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900, in one embodiment. Multiple input/output devices 950 may be present in computer system 900 or may be distributed on various nodes of computer system 900, in one embodiment. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, that implement the various embodiments of the systems as described herein, and data store 935, comprising various data accessible by program instructions 925, in one embodiment. In one embodiment, program instructions 925 may include software elements of embodiments as described herein and as illustrated in the Figures. Data storage 935 may include data that may be used in embodiments. In other embodiments, other or different software elements and data may be included.

Those skilled in the art will appreciate that computer system 900 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 900 may be transmitted to computer system 900 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors; and
   one or more memories, wherein the one or more memories have stored thereon instructions, which when executed by the one or more processors, cause the one or more processors to:
   receive, from a client, a request to enable replication of changes for a source table of a distributed database to a destination, wherein the request specifies the source table and the destination;
   enable the replication of changes for the source table to the destination, wherein for a given change to be replicated, the distributed database modifies a format of the change before the distributed database sends the change based on a data storage format of the destination that is different than a data storage format of the distributed database;
   monitor performance of the replication of changes for the source table to the destination to determine whether to modify a capacity to perform the replication of changes for the source table to the destination, wherein the performance comprises propagation delay for the replication of changes for the source table to the destination; and
   based at least on the propagation delay for the replication of changes for the source table to the destination, modify the capacity to perform the replication of changes for the source table to the destination.

2. The system of claim 1, wherein to modify the capacity to perform the replication of changes for the source table to the destination, the instructions cause the one or more processors to:
   determine that the performance of the replication of changes for the source table to the destination has fallen below a threshold performance; and in response to the determination that the performance of changes for the source table to the destination has fallen below the threshold performance, increase the capacity to perform the replication of changes for the source table to the destination.

3. The system of claim 2, wherein to determine that the performance of the replication of changes for the source table to the destination has fallen below a threshold performance, the instructions cause the one or more processors to:
determine that a propagation delay for a given change for the source table to be accepted at the destination exceeds a threshold propagation delay.

4. The system of claim 1, wherein to modify the capacity to perform the replication of changes for the source table to the destination, the instructions cause the one or more processors to:
assign one or more new replication nodes to perform at least a portion of the replication of changes for the source table to the destination.

5. A method, comprising:
replicating changes for a source table of a distributed database to a destination, wherein for a given change to be replicated, the distributed database modifies a format of the change before the distributed database sends the change based on a data storage format of the destination that is different than a data storage format of the distributed database;
determining that performance of the replication of changes for the source table to the destination falls below a threshold performance, wherein the performance comprises propagation delay for the replication of changes for the source table to the destination; and
based at least on the propagation delay for the replication of changes for the source table to the destination, increasing a capacity to perform the replication of changes for the source table to the destination.

6. The method of claim 5, further comprising:
receiving, from a client, a request to enable replication of changes for the source table of the distributed database to the destination; and
in response to receiving the request to enable the replication of changes, enable the replicating of the changes for the source table to the destination.

7. The method of claim 6, wherein the destination is a table at another database, and further comprising:
receiving, from a client, a request to create the table;
in response to receiving the request to create the table, determine whether the client is authorized to create the table; and
in response to determining that the client is authorized to create the table, create the table at the other database.

8. The method of claim 5, wherein the determining that the performance of the replication of changes for the source table to the destination has fallen below a threshold performance comprises:
determining that a propagation delay for a given change for the source table to be accepted at the destination exceeds a threshold propagation delay.

9. The method of claim 5, wherein the increasing the capacity to perform the replication of changes for the source table to the destination comprises:
assigning one or more new replication nodes to perform at least a portion of the replication of changes for the source table to the destination.

10. The method of claim 5, further comprising:
receiving, from a client, a specification of a value to be used for the threshold performance; and
assigning the value to the threshold performance.

11. The method of claim 10, further comprising:
configuring, based on the threshold performance, one or more replication nodes to be available to perform the replication of changes for the source table to the destination.

12. The method of claim 5, further comprising:
receiving, from a client, a specification of a particular table as the destination, wherein another database comprises the table, and wherein the other database is a different type of database than the distributed database.

13. The method of claim 5, further comprising:
receiving, from a client, a specification of a particular object of an object-based data store as the destination, wherein the object-based data store is a different type of data store than the distributed database.

14. One or more non-transitory computer-accessible storage media storing program instructions that when executed on or across one or more computing devices cause the one or more computing devices to implement:
enable replication of changes for a source table of a distributed database to a destination, wherein for a given change to be replicated, the distributed database modifies a format of the change before the distributed database sends the change based on a data storage format of the destination that is different than a data storage format of the distributed database;
monitor performance of the replication of changes for the source table to the destination to determine whether to modify a capacity to perform the replication of changes for the source table to the destination, wherein the performance comprises propagation delay for the replication of changes for the source table to the destination; and
based at least on the propagation delay for the replication of changes for the source table to the destination, modify the capacity to perform the replication of changes for the source table to the destination.

15. The one or more storage media as recited in claim 14, wherein the program instructions cause the one or more computing devices to further implement:
receive, from a client, a request to enable the replication of changes for the source table of the distributed database to the destination; and
in response to receiving the request to enable the replication of changes, enable the replication of the changes for the source table to the destination.

16. The one or more storage media as recited in claim 14, wherein to modify the capacity to perform the replication of changes for the source table to the destination, the program instructions cause the one or more computing devices to further implement:
determine that the performance of the replication of changes for the source table to the destination has fallen below a threshold performance; and
in response to the determination that the performance of changes for the source table to the destination has fallen below the threshold performance, increase the capacity to perform the replication of changes for the source table to the destination.

17. The one or more storage media of claim 16, wherein to determine that the performance of the replication of changes for the source table to the destination has fallen below the threshold performance, the program instructions cause the one or more computing devices to further implement:

determine that a propagation delay for a given change for the source table to be accepted at the destination exceeds a threshold propagation delay.

18. The one or more storage media of claim 16, wherein the program instructions cause the one or more computing devices to further implement:

receive, from a client, a request to create the destination, wherein the destination is an instance of a scalable data storage and search service; and in response to receiving the request to create the destination, determine whether the client is authorized to create the destination; and in response to determining that the client is authorized to create the destination, create the destination at the scalable data storage and search service.

19. The one or more storage media of claim 18, wherein the program instructions cause the one or more computing devices to further implement:

configure, based on the threshold performance, one or more replication nodes to be available to perform the replication of changes for the source table to the destination.

20. The one or more storage media of claim 14, wherein to modify the capacity to perform the replication of changes for the source table to the destination, the program instructions cause the one or more computing devices to further implement:

assign one or more new replication nodes to perform at least a portion of the replication of changes for the source table to the destination.

\* \* \* \* \*